United States Patent
Narita (10) Patent No.: US 9,710,202 B2
(45) Date of Patent: Jul. 18, 2017

(54) IMAGE FORMING APPARATUS HAVING FIRST SHEET HOLDING UNIT FOR WHICH SHEET TYPE IS REGISTERED AND SECOND SHEET HOLDING UNIT FOR WHICH SHEET TYPE IS NOT REGISTERED, METHOD FOR CONTROLLING IMAGE FORMING APPARATUS, AND STORAGE MEDIUM

(71) Applicant: CANON KABUSHIKI KAISHA, Tokyo (JP)

(72) Inventor: Tateki Narita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/989,201

(22) Filed: Jan. 6, 2016

(65) Prior Publication Data

US 2016/0205281 A1    Jul. 14, 2016

(30) Foreign Application Priority Data

Jan. 9, 2015 (JP) .................. 2015-003248

(51) Int. Cl.
*G06F 3/00* (2006.01)
*G03G 15/00* (2006.01)
*G06F 3/12* (2006.01)

(52) U.S. Cl.
CPC ....... *G06F 3/1204* (2013.01); *G03G 15/5029* (2013.01); *G03G 15/6508* (2013.01);
(Continued)

(58) Field of Classification Search
CPC ............ G03G 15/502; G03G 15/5029; G03G 15/6508; G03G 15/5095; G03G 15/6588; G03G 2215/00734; G03G 2215/00738; G03G 2215/00742; G03G 2215/00751; G06F 3/1204; G06F 3/1254; G06F 3/1255; G06F 3/1258; G06F 3/121; G06F 3/1231; G06F 3/1235; G06F 3/1285
(Continued)

(56) References Cited

U.S. PATENT DOCUMENTS 8,780,411 B2 * 7/2014 Kiuchi .................. G03G 15/50
358/2.1
9,058,555 B2 * 6/2015 Kanamoto ............ G06F 3/1204
(Continued)

FOREIGN PATENT DOCUMENTS

JP       03192038 A   *   8/1991
JP       2001191618 A  *   7/2001
(Continued)

Primary Examiner — Robert Beatty
(74) Attorney, Agent, or Firm — Canon U.S.A., Inc. IP Division (57) ABSTRACT

An image forming apparatus includes a search unit that, in a case where job data in which a sheet type in sheet feeding setting information is specified is received, searches for a sheet cassette of which a sheet type in sheet setting information of the sheet cassette is unregistered, and an execution unit that, in a case where, as a result of the search, there is a sheet cassette of which a sheet type in the sheet setting information is unregistered, executes processing of sheet type detection for detecting a type of a sheet set in the sheet cassette.

7 Claims, 8 Drawing Sheets

(52) U.S. Cl.
CPC ............ *G06F 3/121* (2013.01); *G06F 3/1235* (2013.01); *G06F 3/1255* (2013.01); *G06F 3/1285* (2013.01)

(58) Field of Classification Search
USPC .......................................... 399/45, 82, 389
See application file for complete search history.

(56) References Cited

U.S. PATENT DOCUMENTS

| | | | |
|---|---|---|---|
| 9,235,361 B2 * | 1/2016 | Ito | G06F 3/1204 |
| 2010/0214601 A1 * | 8/2010 | Narita | G06F 3/121 |
| | | | 358/1.15 |
| 2010/0296830 A1 * | 11/2010 | Kamata | G03G 15/6508 |
| | | | 399/81 |
| 2012/0163851 A1 * | 6/2012 | Masuyama | G03G 15/6508 |
| | | | 399/81 |
| 2016/0011555 A1 * | 1/2016 | Akimoto | G03G 15/502 |
| | | | 399/81 |
| 2016/0039234 A1 * | 2/2016 | Hirai | G06F 3/1206 |
| | | | 347/5 |

FOREIGN PATENT DOCUMENTS

| | | | |
|---|---|---|---|
| JP | 2011064940 A | * | 3/2011 |
| JP | 2012089043 A | * | 5/2012 |
| JP | 2014-133656 A | | 7/2014 |

\* cited by examiner

| | MANUAL REGISTRATION METHOD | AUTOMATIC REGISTRATION METHOD | DEFINITION OF SHEET TYPE UNREGISTERED STATE |
|---|---|---|---|
| SPECIFICATION PATTERN 1 | PRESENT | PRESENT | • USER HAS NOT SET SHEET TYPE IN MANUAL REGISTRATION SETTING<br>• AUTOMATIC DETECTION HAS NOT BEEN PERFORMED IN AUTOMATIC REGISTRATION SETTING (AUTOMATIC DETECTION ASSOCIATED WITH PRINT JOB) |
| SPECIFICATION PATTERN 2 | PRESENT | ABSENT | • USER HAS NOT SET SHEET TYPE IN MANUAL REGISTRATION SETTING |
| SPECIFICATION PATTERN 3 | ABSENT | PRESENT | • AUTOMATIC DETECTION HAS NOT BEEN PERFORMED IN AUTOMATIC REGISTRATION SETTING (AUTOMATIC DETECTION ASSOCIATED WITH PRINT JOB) |

|  | CASSETTE | SHEET TYPE | SHEET SIZE |
|---|---|---|---|
| SETTING PATTERN 1 | AUTOMATIC | — | FIXED |
| SETTING PATTERN 2 | FIXED | — | FIXED |
| SETTING PATTERN 3 | — | FIXED | FIXED |

IMAGE FORMING APPARATUS HAVING FIRST SHEET HOLDING UNIT FOR WHICH SHEET TYPE IS REGISTERED AND SECOND SHEET HOLDING UNIT FOR WHICH SHEET TYPE IS NOT REGISTERED, METHOD FOR CONTROLLING IMAGE FORMING APPARATUS, AND STORAGE MEDIUM

BACKGROUND

Field

Aspects of the present invention generally relate to an image forming apparatus, a method for controlling an image forming apparatus, and a storage medium.

Description of the Related Art

An image forming apparatus such as a printer receives a print job from an external apparatus such as a personal computer (PC) and compares sheet feeding setting information (sheet settings and cassette specifying) described in the received data with sheet setting information set for cassettes (sheet cassettes including a manual-feeding tray are referred to as "cassettes") of the image forming apparatus. Then, the image forming apparatus selects a cassette in which an appropriate sheet is set, and executes printing. The sheet setting information of each cassette includes a sheet size and a sheet type (plain paper or thick paper), and according to the sheet size and the sheet type, the image forming apparatus adjusts a sheet conveyance speed and a toner fixing temperature in a printing unit and executes printing. The sheet type indicates the type of a sheet and is defined by the basis weight (weight per unit area) and the surface property of the sheet. For example, sheets different in thickness are classified into plain paper, thin paper, and thick paper, based on their basis weights. Further, the plain paper may be subdivided into plain paper 1, plain paper 2, and plain paper 3. For example, sheets different in material are classified into overhead projector (OHP) film and coated paper, based on their surface properties.

There are a case where a user manually sets the sheet setting information of each cassette, and a case where the image forming apparatus detects a set sheet using a sensor and automatically sets the sheet setting information of each cassette. Conventionally, there has been an image forming apparatus that automatically detects a sheet size using a sensor. In recent years, an image forming apparatus capable of automatically detecting a sheet type (plain paper or thick paper) using a sensor has also appeared. This sheet type detection eliminates the need for the user to manually set a sheet type when a sheet is set in a cassette. This improves the convenience of the image forming apparatus. The sheet type detection, however, is performed not in the state where a sheet is set in a cassette, but in the state where the sheet is conveyed from the cassette to a sheet discharge tray. Thus, the image forming apparatus performs sheet type detection in a print job to be executed after the user sets the sheet in the cassette. Then, the image forming apparatus registers the detection result as sheet setting information of the cassette. Japanese Patent Application Laid-Open No. 2014-133656 discusses a technique for performing sheet type detection and storing the detection result as sheet setting information of a cassette.

If, however, a sheet type is specified in sheet feeding setting information of a print job, sheet type detection cannot be performed. Thus, a cassette cannot be selected, and the job stops due to the absence of a sheet. This is because, as described above, sheet type detection is performed not in the state where a sheet is set in a cassette, but in the state where the sheet is conveyed from the cassette to a sheet discharge tray. As a result, for a job in which a sheet type is specified (for example, plain paper), it is not allowed to perform printing in the state where a sheet type is not identified (for example, actually, thick paper is set). If the job stops due to the absence of a sheet, not only the job cannot be executed, but also the succeeding jobs are kept waiting and stop. Even if the succeeding jobs include a job that can be executed, the job stops.

SUMMARY

According to an aspect of the present invention, an image forming apparatus includes a search unit configured to, in a case where job data in which a sheet type in sheet feeding setting information is specified is received, search for a sheet cassette of which a sheet type in sheet setting information of the sheet cassette is unregistered, and an execution unit configured to, in a case where as a result of the search by the search unit, there is a sheet cassette of which a sheet type in the sheet setting information is unregistered, execute processing of sheet type detection for detecting a type of a sheet set in the sheet cassette.

Further features of the present disclosure will become apparent from the following description of exemplary embodiments with reference to the attached drawings.

DESCRIPTION OF THE EMBODIMENTS

Exemplary embodiments of aspects of the present invention will be described below with reference to the drawings.

A first exemplary embodiment is described below. An image forming apparatus according to the present exemplary embodiment includes a sheet size and a sheet type as sheet setting information of a cassette. The setting value of each of the sheet size and the sheet type is registered by a manual registration method, in which a registration is performed by a user, or an automatic registration method, in which automatic detection is performed. The manual registration method refers to a method in which die user selects a sheet size and a sheet type from a list of setting items in a sheet setting screen displayed on an operation unit 105 (described below) illustrated in FIG. 1, and sets and registers the sheet size and the sheet type. The automatic registration method refers to a method in which the image forming apparatus automatically detects a sheet size and a sheet type using a sheet size detection sensor 710 and a sheet type detection sensor 709 (each described below) illustrated in FIG. 2 and registers the sheet size and the sheet type.

In the present exemplary embodiment, it is assumed that a sheet size is always in the state of already being registered even in the case of automatic registration, because automatic detection is performed when a sheet is set. On the other hand, in the case of automatic registration, there is an unregistered state in which a sheet type is not registered from an initial state where a sheet is set to the timing at which sheet type detection is performed. The definition of the unregistered state of the sheet type will be described below with reference to FIG. 4.

Figure 1:
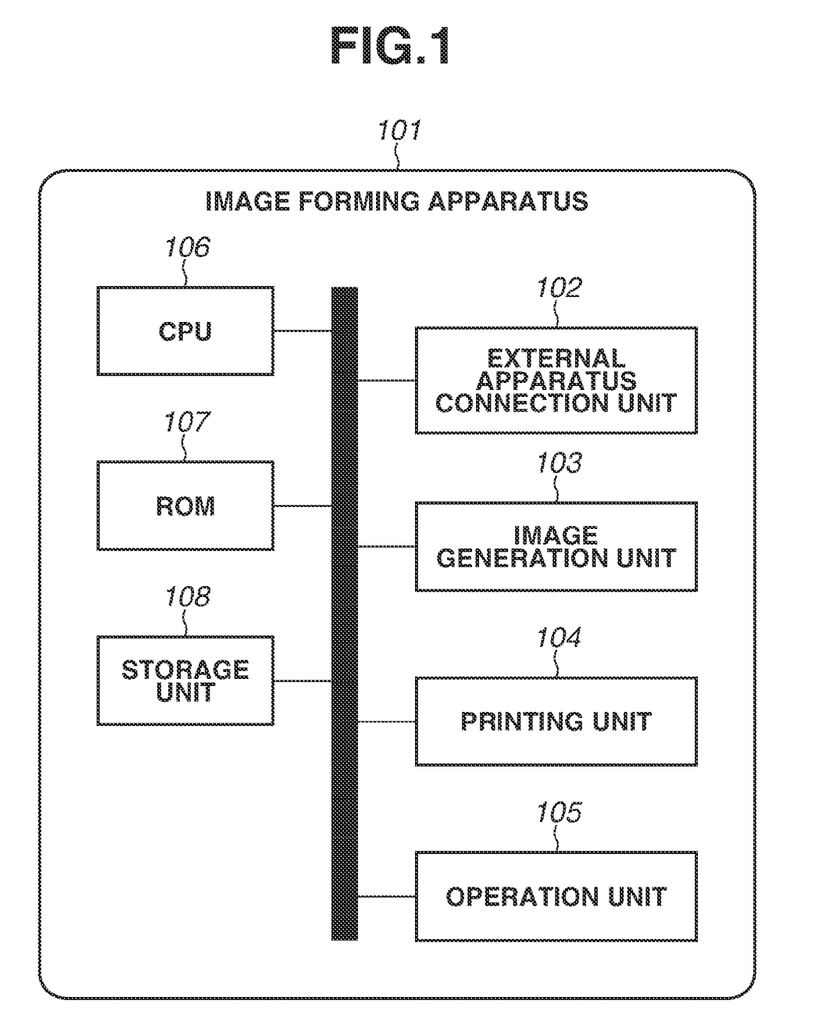
FIG. 1 is a block diagram illustrating an example of a hardware configuration of an image forming apparatus.

FIG. 1 is a block diagram illustrating an example of the hardware configuration of the image forming apparatus.

An image forming apparatus 101 includes an external apparatus connection unit 102. The external apparatus connection unit 102 communicates with an external apparatus via a local area network (LAN) and a Universal Serial Bus (USB) interface, and transmits and receives image data to and from the external apparatus. The image forming apparatus 101 includes an image generation unit 103. The image generation unit 103 converts page description language (PDL) data acquired by the external apparatus connection unit 102 into an image and performs predetermined image processing such as color space conversion and color density adjustment, thereby generating image data. The image forming apparatus 101 includes a printing unit 104, which includes a cassette in which a paper medium is set. The printing unit 104 prints on the set paper medium the image data generated by the image generation unit 103. The printing unit 104 can detect the sheet size of the paper medium in the state where the paper medium is set. The printing unit 104 can detect the sheet type (plain paper or thick paper) of the paper medium when the paper medium is conveyed. The image forming apparatus 101 includes an operation unit 105. The operation unit 105 includes a user interface such as a key and a display panel and receives an operation request from the user. The image forming apparatus 101 includes a central processing unit (CPU) 106, a read-only memory (ROM) 107, and a storage unit 108. The CPU 106 is a control unit of the image forming apparatus 101 and controls the entirety of the apparatus. The ROM 107 is used to store a control program for the CPU 106. The storage unit 108 is a volatile memory for storing variables for the control program for the CPU 106 and image data.

The CPU 106 executes processing based on a program stored in the ROM 107 or the storage unit 108, thereby achieving the function of the image forming apparatus 101 and the processing of a flowchart described, below.

Figure 2:
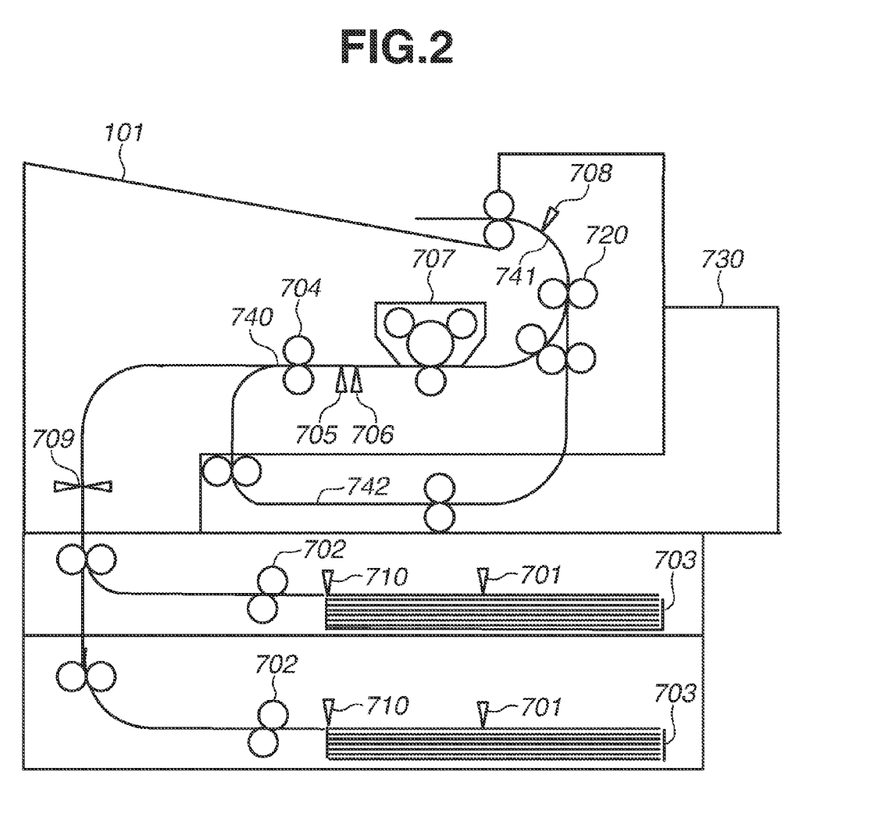
FIG. 2 is a configuration diagram illustrating sheet conveying paths and sensors in a printing unit of the image forming apparatus.

FIG. 2 is a configuration diagram illustrating sheet conveying paths and sensors in the printing unit 104 of the image forming apparatus 101. The image forming apparatus 101 includes sheet cassettes 703, an image forming unit 707, a main conveying path 740, a discharge conveying path 741, a reverse conveying path 742, and a two-sided unit 730. Further, to convey a sheet in each conveying path, the image forming apparatus 101 includes a plurality of rollers such as feed rollers 702, registration rollers 704, and discharge rollers 720. Further, to detect a sheet in the apparatus, the image forming apparatus 101 includes a plurality of sensors such as sheet presence/absence sensors 701, sheet size detection sensors 710, a registration sensor 705, a sheet detection sensor 706, a discharge sensor 708, and a sheet type detection sensor 709.

Each of the sheet cassettes 703 functions as a feeding unit and supplies, into the apparatus, a sheet on which an image is to be formed. To form the image on the sheet, the image forming unit 707 includes an exposure unit, a photosensitive drum, and a developing unit. The image forming unit 707 forms an electrostatic latent image on the photosensitive drum serving as an image bearing member, using the exposure unit. The formed electrostatic latent image is developed by the developing unit and transferred onto the sheet at a predetermined transfer position. A toner image formed on the sheet is heated and pressurized by a fixing device, thereby fixing the toner image formed on the sheet.

The main conveying path 740 is a conveying path arranged between the feed rollers 702 and the discharge rollers 720 and used to form an image on a sheet. The discharge conveying path 741 is a conveying path arranged between the discharge rollers 720 and the outside of the image forming apparatus 101 and discharges the sheet to the outside of the image forming apparatus 101. Further, when images are printed on both sides of the sheet, the discharge conveying path 741 also serves as a conveying path for conveying, to the reverse conveying path 742, the sheet on the front surface of which the image is formed. The reverse conveying path 742 is a conveying path arranged between the discharge rollers 720 and the registration rollers 704 and used to supply to the main conveying path 740 the sheet of which the front and back surfaces are reversed.

Each pair of the feed rollers 702 conveys sheets placed in the sheet cassette 703 one by one into the apparatus. The registration rollers 704 are rollers for adjusting the timing for transferring an image onto the conveyed sheet in the image forming unit 707. The discharge rollers 720 are rollers for discharging the sheet to the outside of the image forming apparatus 101. Further, when images are printed on both sides of the sheet, the discharge rollers 720 convey to the discharge conveying path 741 the sheet on the from surface of which the image is formed, and then rotate backward to convey the sheet to the reverse conveying path 742.

Each of the sheet presence/absence sensors 701 is a sensor for detecting the presence or absence of a sheet placed in the sheet cassette 703. Each of the sheet size detection sensors 710 is a sensor for detecting the size of a sheet placed in the sheet cassette 703. The registration sensor 705, the sheet detection sensor 706, and the discharge sensor 708 detect a conveyed sheet. These sensors may be mechanically configured switches or optically configured sensors. The registration sensor 705 is used to adjust the timing for transferring a toner image formed on the photosensitive drum onto the conveyed sheet. Further, the registration sensor 705 is also used to measure the length of the sheet in the sub-scanning direction. The length of the sheet in the sub-scanning direction is obtained from the time in which the registration sensor 705 detects the conveyed sheet, and the speed of conveying the sheet. The sheet detection sensor 706 is used to detect the presence or absence of a sheet in both end portions of the main conveying path 740 and obtain the length of the sheet in the main scanning direction.

The sheet type detection sensor 709 is a sensor for detecting the thickness (basis weight) of a sheet and the roughness (surface property) of a sheet. When sheet type detection is performed, a sheet is fed from one of the sheet cassettes 703. Then, the sheet is temporarily stopped at the position of the sheet type detection sensor 709, and a sheet type is detected. The sheet type detection sensor 709 includes an optical detection unit and an ultrasonic wave detection unit. The sheet type detection sensor 709 emits light on the front side of the sheet to determine the surface property from a signal of the reflected light, and applies ultrasonic waves from the front side of the sheet to determine the basis weight from a signal received on the back side of the sheet.

Figure 3:
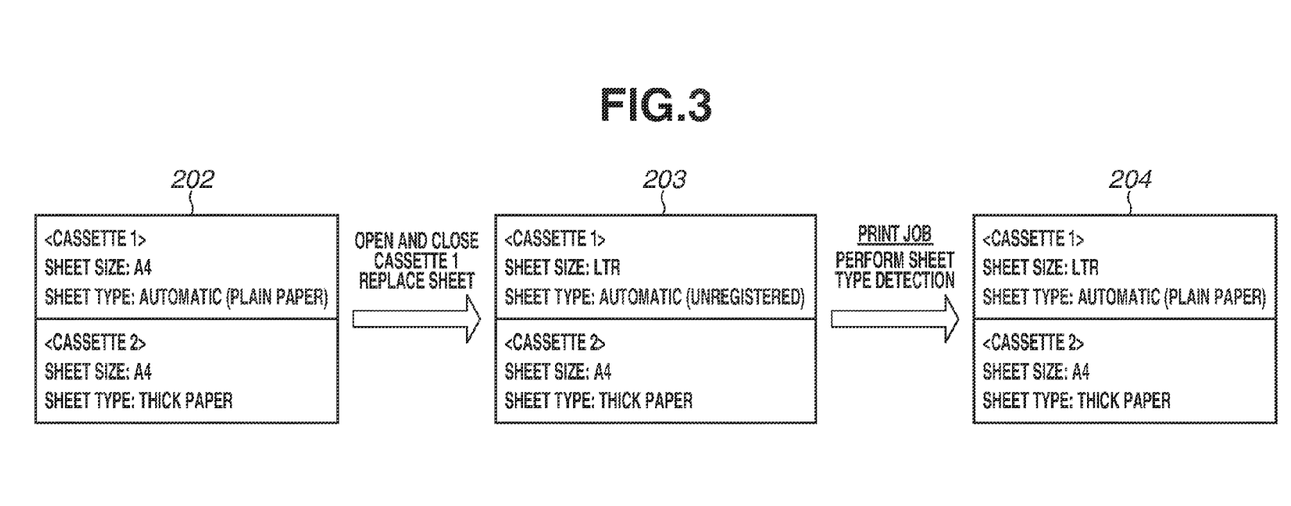
FIG. 3 is a diagram illustrating an example of sheet type registration using sheet type detection.

FIG. 3 is a diagram illustrating an example of sheet type registration using sheet type detection method. FIG. 3 illustrates the operation of, in the state where sheet setting information (the sheet type) of a cassette of the image forming apparatus 101 is unregistered, detecting a sheet type while performing a print job and registering the detected sheet type. The image forming apparatus 101 includes two cassettes. Pieces of sheet setting information 202, 203, and 204 indicate the states of sheet setting information set for the cassettes in respective states. In the sheet setting information 202, A4 is registered as the sheet size of a cassette 1, and the result of automatic detection is set as the sheet type of the cassette 1. In this case, plain paper, which is the previous detection result, has been registered. Then, after the cassette 1 is opened and closed to replace the sheet, the sheet setting information changes to the sheet setting information 203. As a result, letter (LTR) is registered as the sheet size, and the sheet type is in an unregistered state. Then, if the image forming apparatus 101 receives a print job, feeds a sheet from the cassette 1, and performs printing, sheet type detection is performed, and the sheet setting information changes to the sheet setting information 204. As a result, in the sheet setting information 204, plain paper, which is the detection result, is registered as the sheet type of the cassette 1. The print job is an example of job data.

Figure 4:
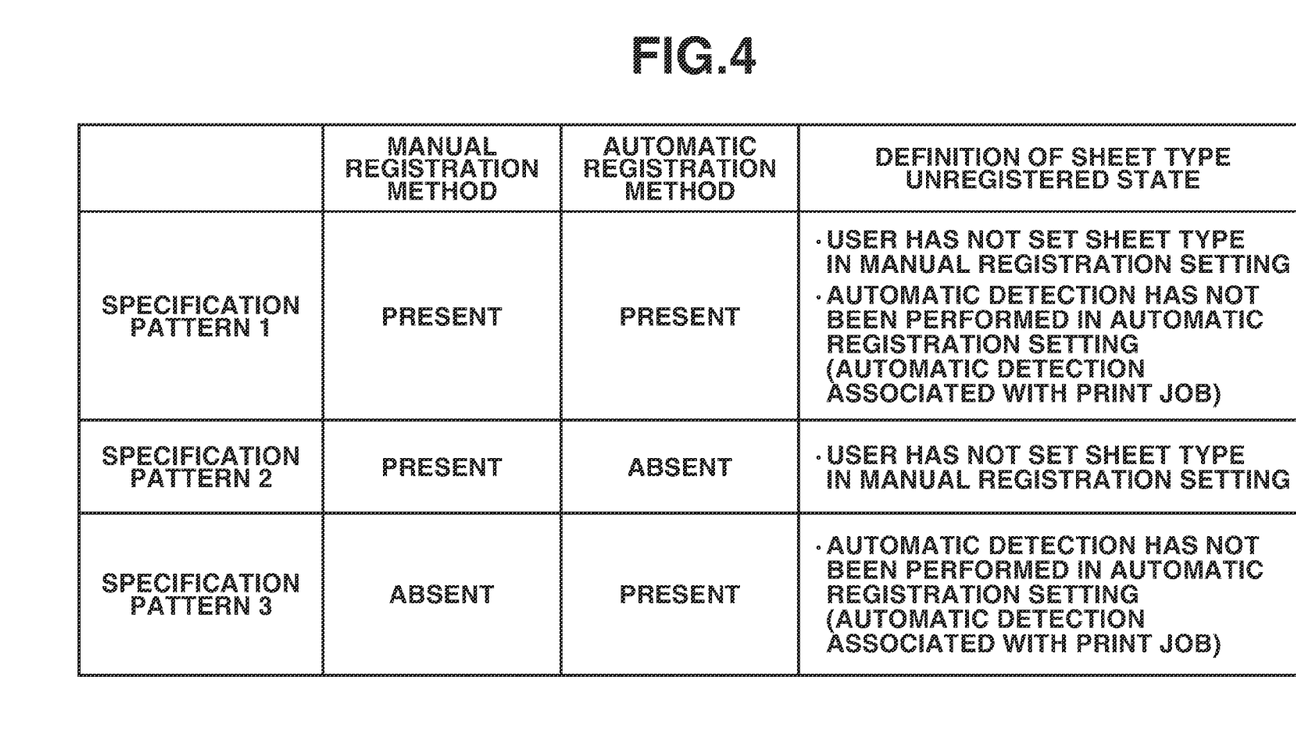
FIG. 4 is a table illustrating a definition of a sheet type unregistered state.

FIG. 4 is a table illustrating definition of a sheet type unregistered state. FIG. 4 illustrates the definition of a sheet type unregistered state, which is the state where the sheet type of a cassette of the image forming apparatus 101 is not registered, that is, the state where automatic detection of a sheet type should be performed. As described above, as a method for registering a sheet type, there are a manual registration method and an automatic registration method, and the image forming apparatus 101 may include both or either one of the methods. The combinations of registration methods included in the image forming apparatus 101 are referred to as "specification patterns", and the definition of the sheet type unregistered state in each specification pattern is described. In a specification pattern 1, the image forming apparatus 101 includes the manual registration method and the automatic registration method as registration methods, and either of the registration methods is set in each cassette. The sheet type unregistered state in the specification pattern 1 is the state where the user has not yet set a sheet type in the case of a manual registration setting, or the state before automatic detection associated with a print job, which has been described in FIG. 3, is performed in the case of an automatic registration setting. In a specification pattern 2, the image forming apparatus 101 includes only the manual registration method as a registration method. The sheet type unregistered state in the specification pattern 2 is the state where the user has not yet set a sheet type. In a specification pattern 3, the image forming apparatus 101 includes only the automatic registration method as a registration method. The sheet type unregistered state in the specification pattern 3 is the state before automatic detection associated with a print job, which has been described in FIG. 3, is performed.

Figure 5A:
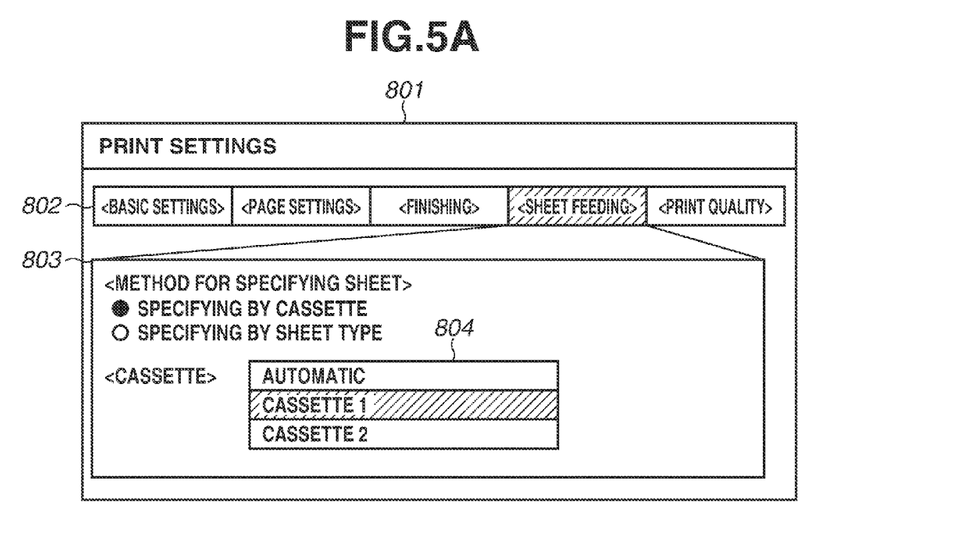
FIGS. 5A and 5B are diagrams illustrating examples of a print setting screen of a printer driver.
Figure 5B:
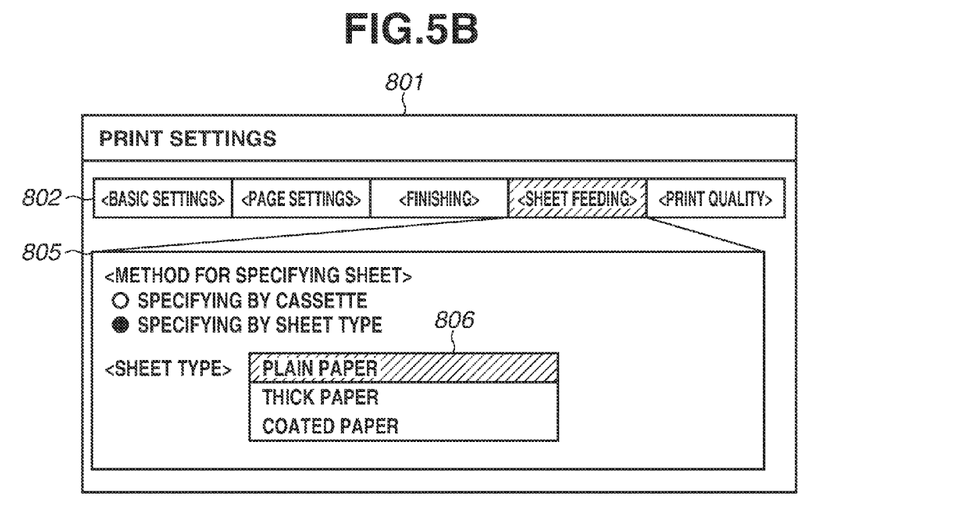

FIGS. 5A and 5B are diagrams illustrating examples of a print setting screen of a printer driver. FIGS. 5A and 5B illustrate examples of a screen of application software in a PC that transmits a print job to the image forming apparatus 101. A description is given here of an example of a method for setting sheet feeding setting information, such as a cassette and a sheet type, included in a print job. The screen is configured such that a print setting screen. 801, i.e., the entirety of the screen, includes item tabs 802 and an item setting screen 803 or 805. The item tabs 802 include setting items such as basic settings, page settings, finishing, sheet feeding, and print quality. A setting screen for a currently selected item is displayed as the item setting screen 803 or 805. The item setting screens 803 and 805 are setting screens for sheet feeding. The setting screens for sheet feeding are screens on which the user selects, as a method for specifying a sheet, either of specifying by a cassette and specifying by a sheet type and sets a detailed item according to the selected method. That is, the determination of whether a sheet is specified by a cassette or specified by a sheet type as the method for specifying a sheet is exclusive, and a setting is optionally made to accept any cassette or any sheet type for the method that is not specified. The item setting screen 803 is in the state where specifying by a cassette is selected as the method for specifying a sheet. The user selects a cassette for the specifying from a list of cassettes on a detailed item screen 804. The detailed item screen 804 is in the state where the cassette 1 is selected. If automatic is selected on the detailed item screen 804, an arbitrary setting is made to accept any cassette.

The item setting screen 805 is in the state where specifying by a sheet type is selected as the method for specifying a sheet. The user selects a sheet type for the specifying from a list of sheet types on a detailed item screen 806. The detailed item screen 806 is in the state where plain paper is selected.

Figure 6:
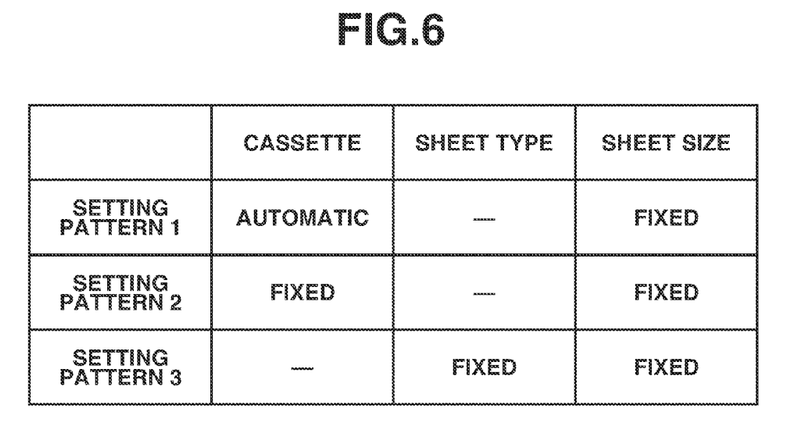
FIG. 6 is a table illustrating an example of sheet feeding setting information of a print job.

FIG. 6 is a table illustrating an example of sheet feeding setting information of a print job. FIG. 6 illustrates the content of sheet feeding setting information described in a print job received by the image forming apparatus 101. Items of the sheet feeding setting information include a "cassette", a "sheet type", and a "sheet size". The "cassette" is a setting for specifying a cassette from which a sheet is fed. As the "cassette", automatic (not specified) or a fixed value (individually specified, such as the cassette 1) is set. The "sheet type" is a setting for specifying a sheet type for use in printing. As the "sheet type", a fixed value (individually specified, such as plain paper) is set. It is, however, assumed that either of the "cassette" and the "sheet type" is exclusively set, and the item that is not set is treated as not being specified. The "sheet size" is a setting for specifying a sheet size for use in printing. As the "sheet size", a fixed value (individually specified, such as A4) is set. Thus, as illustrated in FIG. 6, the sheet feeding setting information has three setting patterns.

Figure 7:
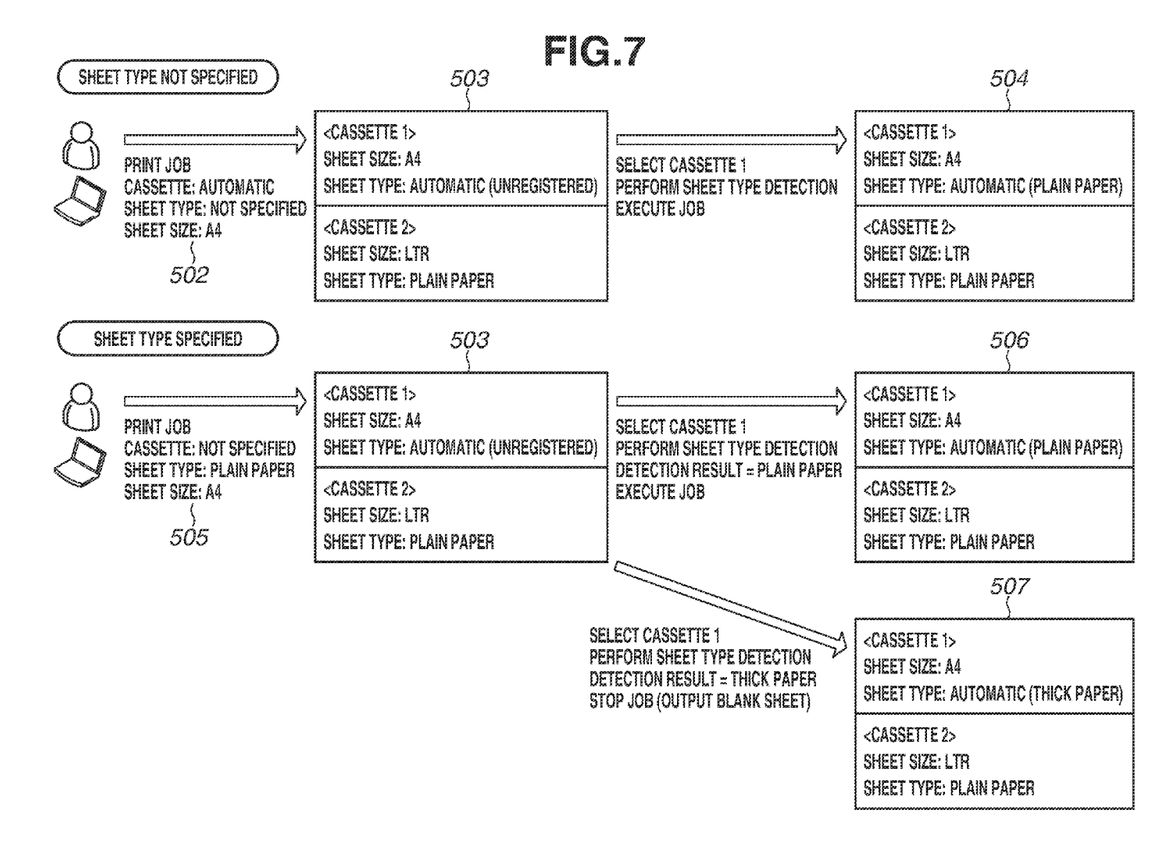
FIG. 7 is a diagram illustrating an example of an operation of performing sheet type detection.

FIG. 7 is a diagram illustrating an example of the operation of performing sheet type detection. FIG. 7 illustrates sheet type detection performed when the absence of a sheet occurs, and illustrates the operation of performing sheet type detection performed in a case where, in the state where the sheet type of a cassette is unregistered, the image forming apparatus 101 receives a print job in which a sheet type is specified. The image forming apparatus 101 includes two cassettes. Initially, as illustrated in sheet setting information 503, in the sheet setting information of the cassettes, is registered as the sheet size of the cassette 1, and the sheet type of the cassette 1 is unregistered. LTR is registered as the sheet size of the cassette 2, and plain paper is registered as the sheet type of the cassette 2.

First, a case is described where a print job 502, in which a sheet type is not specified, is received. The image forming apparatus 101 compares sheet feeding setting information of the print job 502 with the sheet setting information of each cassette. Since a cassette and a sheet type are not specified in the sheet feeding setting information, the image forming apparatus 101 selects the cassette 1, of which the sheet size matches that in the sheet feeding setting information. Then, the image forming apparatus 101 feeds a sheet from the cassette 1 and executes the job. Further, the image forming apparatus 101 simultaneously performs sheet type detection and registers the detection result as the sheet type of the cassette 1. Since a sheet type is not specified in the print job 502, the image forming apparatus 101 performs printing, regardless of the detection result.

Next, a case is described where a print job 505, in which a sheet type is specified, is received. The image forming apparatus 101 compares sheet feeding setting information of the print job 505 with the sheet setting information of each cassette. Since there is no cassette of which both the sheet type and the sheet size match those specified in the sheet feeding setting information, the image forming apparatus 101 determines that there is no sheet. Then, the image forming apparatus 101 performs sheet type detection on the cassette 1, of which the sheet size matches that in the sheet feeding setting information but the sheet type is unregistered. If the detection result matches the sheet type specified in the sheet feeding setting information (plain paper in this case), the image forming apparatus 101 continues printing, executes the job, registers the detection result as the sheet type of the cassette 1, and updates the sheet setting information to sheet setting information 506. If the detection result does not match the sheet type specified in the sheet feeding setting information (thick paper in this case), the image forming apparatus 101 suspends printing (outputs a sheet as a blank sheet), stops the job, registers the detection result as the sheet type of the cassette 1, and updates the sheet setting information to sheet setting information 507.

If a conventional image forming apparatus receives the print job 505, the conventional image forming apparatus stops the job when determining that there is no sheet. Thus, even if there is actually a cassette that matches that specified in the sheet feeding setting information, the conventional image forming apparatus stops the job, thus causing inconvenience. In the present exemplary embodiment, sheet type detection is performed on a cassette of which the sheet type is unregistered, thereby avoiding unnecessary stoppage of a job.

Figure 8:
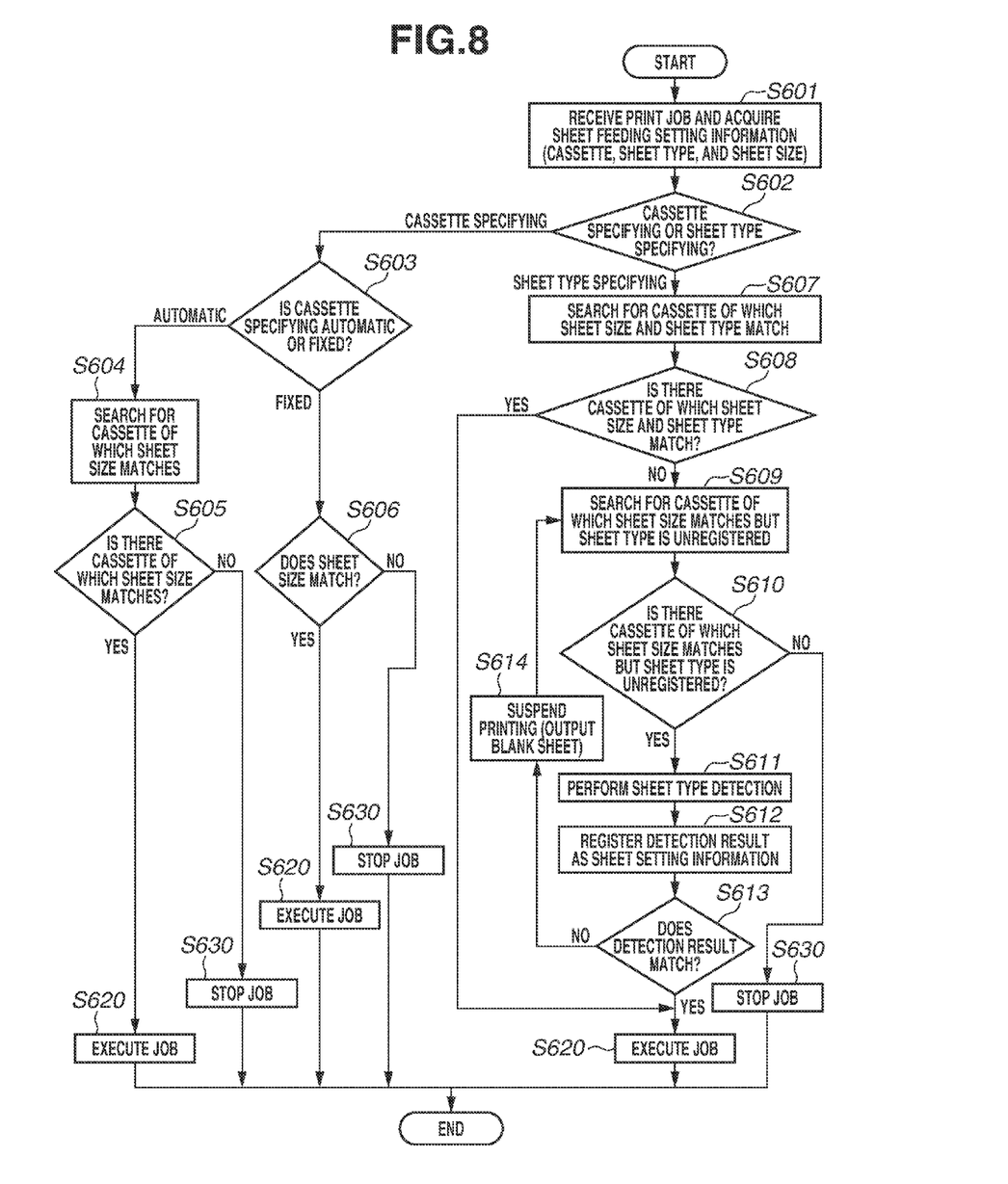
FIG. 8 is a flowchart illustrating an example of information processing according to an exemplary embodiment.

The following control program for achieving the present exemplary embodiment regarding FIG. 8 is stored in the ROM 107, loaded into the storage unit 108, and executed by the CPU 106.

FIG. 8 is a flowchart illustrating an example of information processing according to the present exemplary embodiment. FIG. 8 illustrates control from a timing at which the image forming apparatus 101 receives a print job to a timing at which the image forming apparatus 101 executes or stops the job.

In step S601, the CPU 106 acquires sheet feeding setting information (a cassette, a sheet type, and a sheet size) from data of a print job received from the external apparatus connection unit 102. In step S602, since the sheet feeding setting information of the print job has a setting pattern as illustrated in FIG. 6, the CPU 106 determines whether the setting pattern cassette specifying (a setting pattern 1 or 2) or sheet type specifying (a setting pattern 3). If the setting pattern is cassette specifying ("cassette specifying" in step S602), then in step S603, the CPU 106 further determines whether the cassette specifying is automatic or fixed.

If the cassette specifying is automatic ("automatic" in step S603: the setting pattern 1), then in step S604, the CPU 106 searches, among the cassettes of the printing unit 104, for a cassette of which the sheet size matches that in the sheet feeding setting information. If there is a cassette of which the sheet size matches that in the sheet feeding setting information (YES in step S605), then in step S620, the CPU 106 feeds a sheet from the cassette and executes the job. If, on the other hand, there is no cassette of which the sheet size matches that in the sheet feeding setting information (NO in step S605), then in step S630, the CPU 106 stops the job.

Further, if the cassette specifying is fixed ("fixed" in step S603: the setting pattern 2), then in step S606, the CPU 106 determines whether the sheet size of the cassette specified in the sheet feeding setting information matches the sheet size in the sheet feeding setting information. If the sheet size of the cassette specified in the sheet feeding setting information matches the sheet size in the sheet feeding setting information (YES in step S606), then in step S620, the CPU 106 executes the job. If, on the other hand, the sheet size of the cassette specified. In the sheet feeding setting information does not match the sheet size in the sheet feeding setting information (NO in step S606), then in step S630, the CPU 106 stops the job.

Further, if the setting pattern is sheet type specifying ("sheet, type specifying" in step S602: the setting pattern 3), then in step S607, the CPU 106 searches, among the cassettes of the printing unit 104, for a cassette of which both the sheet size and the sheet type match those in the sheet feeding setting information. If there is a cassette of which both the sheet size and the sheet type match those in the sheet feeding setting information (YES in step S608), then in step S620, the CPU 106 feeds a sheet from the cassette and executes the job. If, on the other hand, there is no cassette of which both the sheet size and the sheet type match those in the sheet feeding setting information (NO in step S608), then in step S609, the CPU 106 searches for a cassette of which the sheet size matches that in the sheet feeding setting information but the sheet type is unregistered. If there is no corresponding cassette (NO in step S610), then in step S630, the CPU 106 stops the job if there is a corresponding cassette (YES in step S610), then in step S611, the CPU 106 executes the processing of sheet type detection on the cassette. Then, in step S612, the CPU 106 registers, as the sheet setting information of the cassette, the sheet type obtained as the detection result. In step S613, the CPU 106 determines whether the detection result matches the sheet feeding setting information, that is, whether the sheet type obtained as the detection result matches the sheet type in the sheet feeding setting information. If the detection result matches the sheet feeding setting information (YES in step S613), then in step S620, the CPU 106 executes the job. If the detection result does not match the sheet feeding setting information (NO in step S613), then in step S614, the CPU 106 suspends printing and outputs a sheet as a blank sheet. After the process of step S614, then in step S609, the CPU 106 searches for a cassette of which the sheet size matches that in the sheet feeding setting information but the sheet type is unregistered again.

In the search processes in steps S604, S607, and S609, the CPU 106 sequentially performs a search from the upper cassette, for example.

According to the processing in the present exemplary embodiment, in a print job in which a sheet type is specified, sheet type detection is performed on a cassette of which the sheet type is unregistered, whereby it is possible to obtain the effect of avoiding unnecessary stoppage of a job, thereby improving convenience.

As described above, according to the above exemplary embodiment, it is possible to avoid unnecessary stoppage of a job due to the absence of a sheet, thereby improving the convenience of a user.

Other Embodiments

Embodiment(s) of aspects of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-003248, filed Jan. 9, 2015, which is hereby incorporated by reference herein in its entirety.

What is claimed is:

1. A printing apparatus comprising:
   sheet holding units including a first sheet holding unit for which a sheet type is registered and a second sheet holding unit for which a sheet type is not registered;
   a selecting unit configured to select the second sheet holding unit as a sheet feeding source in accordance with a sheet type designated by a print job being not registered in the sheet holding units;
   a detecting unit configured to detect a sheet type of the sheet fed from the second sheet holding unit selected by the selecting unit;
   a determining unit configured to determine whether the sheet type designated by the print job matches the sheet type detected by the detecting unit; and
   a printing unit configured to print an image on a sheet fed from the second sheet holding unit selected by the selecting unit in a case where the determining unit determines that the sheet type designated by the print job matches the sheet type detected by the detecting unit.

2. The printing apparatus according to claim 1, further comprising a registering unit configured to register a sheet type for the sheet holding units.

3. The printing apparatus according to claim 1, wherein the sheet type is a thickness of the sheet or a surface property.

4. The image forming apparatus according to claim 1, further comprising
   a control unit configured to suspend printing by the printing unit in a case where the determining unit determines that the sheet type designated by the print job does not match the sheet type detected by the detecting unit.

5. The image forming apparatus according to claim 4, wherein the control unit performs control so that a blank sheet is output when the printing by the printing unit is suspended.

6. A control method for controlling a printing apparatus which has sheet holding units including a first sheet holding unit for which a sheet type is registered and a second sheet holding unit for which a sheet type is not registered, the control method comprising:
   selecting the second sheet holding unit as a sheet feeding source in accordance with a sheet type designated by a print job being not registered in the sheet holding units;
   detecting a sheet type of the sheet fed from the selected second sheet holding unit;
   determining whether the sheet type designated by the print job matches the detected sheet type; and
   printing an image on the sheet fed from the selected second sheet holding unit in a case where it is determined that the sheet type designated by the print job matches the detected sheet type.

7. A non-transitory computer-readable storage medium storing computer executable instructions that causes a computer to perform a control method for controlling a printing apparatus which has sheet holding units including a first sheet holding unit for which a sheet type is registered and a second sheet holding unit for which a sheet type is not registered, the control method comprising:
   selecting the second sheet holding unit as a sheet feeding source in accordance with a sheet type designated by a print job being not registered in the sheet holding units;
   detecting a sheet type of the sheet fed from the selected second sheet holding unit;
   determining whether the sheet type designated by the print job matches the detected sheet type; and
   printing an image on the sheet fed from the selected second sheet holding unit in a case where it is determined that the sheet type designated by the print job matches the detected sheet type.

* * * * *